(12) United States Patent
von Albrichsfeld et al.

(10) Patent No.: US 8,075,067 B2
(45) Date of Patent: Dec. 13, 2011

(54) BRAKE SYSTEM

(75) Inventors: Christian Albrich von Albrichsfeld, Darmstadt (DE); Timo Gurzawski, Hainburg (DE); Thorsten Ullrich, Gernsheim (DE); Jochen Führer, Darmstadt (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 1025 days.

(21) Appl. No.: 10/568,802

(22) PCT Filed: Aug. 19, 2004

(86) PCT No.: PCT/EP2004/051847
§ 371 (c)(1),
(2), (4) Date: Jun. 16, 2008

(87) PCT Pub. No.: WO2005/032896
PCT Pub. Date: Apr. 14, 2005

(65) Prior Publication Data
US 2008/0251328 A1    Oct. 16, 2008

(30) Foreign Application Priority Data

Aug. 19, 2003   (DE) .................................. 103 37 948

(51) Int. Cl.
*B60T 8/88*   (2006.01)
(52) U.S. Cl. ............................. 303/122.11; 303/122.09
(58) Field of Classification Search .................. 188/356, 188/357; 303/122, 122.09, 122.1, 122.11, 303/122.13, 122.14, 113.4, 114.3; 60/534, 60/535
See application file for complete search history.

(56) References Cited

U.S. PATENT DOCUMENTS 6,209,968 B1 * 4/2001 Bayens et al. ............. 303/114.3
2006/0163941 A1 * 7/2006 Von Hayn et al. ......... 303/113.4

FOREIGN PATENT DOCUMENTS

| DE | 19514382 | 10/1996 |
| DE | 19640107 | 4/1998 |
| DE | 19750977 | 6/1999 |
| DE | 19907338 | 5/2000 |
| WO | 2004005095 | 1/2004 |

* cited by examiner

*Primary Examiner* — Thomas J Williams

(57) ABSTRACT

Disclosed is a brake system of the 'brake-by-wire' type for actuating a motor vehicle brake system having a brake booster which is operable in response to the driver's input by a brake pedal and to an electronic regulating and control unit. A device is provided to decouple a force-transmitting connection between the brake pedal and the brake booster in the 'brake-by-wire' operating mode. The electronic regulating and control unit (7) includes a control circuit for controlling the travel ($S_{Ds}$) covered by the output member (20) of the brake booster (3), the nominal value ($S_{Dsnominal}$) of the travel ($S_{Ds}$) covered by the output member (20) of the brake booster (3) is calculated corresponding to the actuating travel ($S_{Bp}$) of the brake pedal (1), and a monitoring module (24) is provided which, in the case of a fault such as the inclusion of air or brake circuit failure, performs a partial compensation of the extension of the travel ($S_{Ds}$) covered by the output member (20) of the brake booster (3), which extension is caused by the fault.

15 Claims, 4 Drawing Sheets

BRAKE SYSTEM

This application is the U.S. national phase of international application PCT/EP2004/051847 filed Aug. 19, 2004, which designated in the U.S. and which claims the benefit of priority of German Patent Application Number 103 37 948.7 filed Aug. 19, 2003. The contents of each of the aforementioned documents are incorporated herein in their entirety.

BACKGROUND OF THE INVENTION

The present invention relates to a brake system of the 'brake-by-wire' type for actuating a motor vehicle brake system comprising a brake booster which is operable in response to the driver's wish both by means of a brake pedal and by means of an electronic regulating and control unit, with a means being provided to decouple a force-transmitting connection between the brake pedal and the brake booster in the 'brake-by-wire' operating mode, a master brake cylinder connected downstream of the brake booster in terms of effect, to the pressure chambers of which wheel brakes of the motor vehicle are connected, a pedal travel simulator which interacts with the brake pedal and due to which a resetting force acting on the brake pedal can be simulated in the 'brake-by-wire' operating mode independently of an actuation of the brake booster, and which can be enabled in the 'brake-by-wire' operating mode when the force-transmitting connection between the brake pedal and the brake booster is decoupled and can be disabled outside the 'brake-by-wire' operating mode, a first sensor to sense the brake pedal actuating travel, a second sensor to sense the travel of an output member (push rod) of the brake booster, and a third sensor (i.e. a pressure sensor) to sense the brake pressure prevailing in the system, the signals of which sensors are sent to the electronic regulating and control unit.

A brake system of this type is disclosed in the applicant's international patent application WO 2004/005095. It can be taken from the disclosure of the mentioned patent application that the electronic regulating and control unit initiates appropriate safety procedures, in particular a hydraulic fallback mode, on account of detected deviations between preset nominal values and actual values measured by means of the sensors. However, no hints can be taken from the document as to how failure of the hydraulic fallback mode being caused e.g. by the inclusion of air or the occurrence of leakages in the system, can be recognized by the driver or detected by the system, respectively.

SUMMARY OF THE INVENTION

In view of the above, an object of the invention is to disclose measures in a brake system of the type mentioned hereinabove, which render it possible to compensate increased pressure fluid volume absorption in the case of a fault, which is caused by e.g. the inclusion of air or a brake circuit failure, by using control technique means.

A first solution of this object involves that the electronic regulating and control unit includes a control circuit for controlling the travel covered by the output member of the brake booster, the nominal value thereof being calculated corresponding to the actuating travel of the brake pedal, with a monitoring module being provided which, in the case of a fault such as the inclusion of air or brake circuit failure, performs a partial compensation of the extension of the travel covered by the output member of the brake booster, which extension is caused by the fault.

A second solution of the object referred to hereinabove involves that the electronic regulating and control unit includes a control circuit for controlling the travel covered by the output member of the brake booster and the hydraulic pressure prevailing in the system, the nominal values thereof being calculated corresponding to the actuating travel of the brake pedal, with a monitoring module being provided which, in the case of a fault such as the inclusion of air or brake circuit failure, switches the control circuit from the travel control mode to the pressure control mode in order to perform a compensation of the extension of the travel covered by the output member of the brake booster, which extension is caused by the fault.

In a favorable improvement of the first solution of the invention, the partial compensation of the extension of the travel covered by the output member of the brake booster, which extension is caused by the fault, is performed by adding a correction value to the nominal value.

In another favorable embodiment of the subject matter of the invention, a pressure fluid volume/pressure characteristic curve is stored in the monitoring module, i.e. the dependency of the pressure fluid volume absorption of the brakes or of the travel covered by the output member of the brake booster and corresponding to the pressure fluid volume absorption on the hydraulic pressure (p) Q or $S_{Ds}=f(p)$, and the monitoring module is furnished with the actual values of the travel covered by the output member of the brake booster and of the hydraulic pressure prevailing in the system, and a travel value corresponding to the nominal value of the pressure fluid volume is calculated from the actual pressure value and compared with the actual value of the travel covered by the output member of the brake booster, and a fault in the system is concluded when the comparison result exceeds a threshold value.

The above-mentioned correction value can preferably correspond to half the result of the comparison.

In another advantageous improvement of the subject matter of the invention, the control quality is considerably enhanced in that the actual values undergo a low-pass filtering operation.

In another favorable feature of the invention, a transition function, e.g. low-pass filtering or a ramp function, is activated when a case of fault is detected.

It is furthermore provided according to another feature of the invention that a warning lamp is activated when a case of fault is detected in the system.

BRIEF DESCRIPTION OF THE DRAWINGS

Further features and advantages of the invention will be explained in detail in the following description by way of two embodiments, making reference to the accompanying drawings. In the drawings.

DETAILED DESCRIPTION OF THE DRAWINGS

Figure 1:
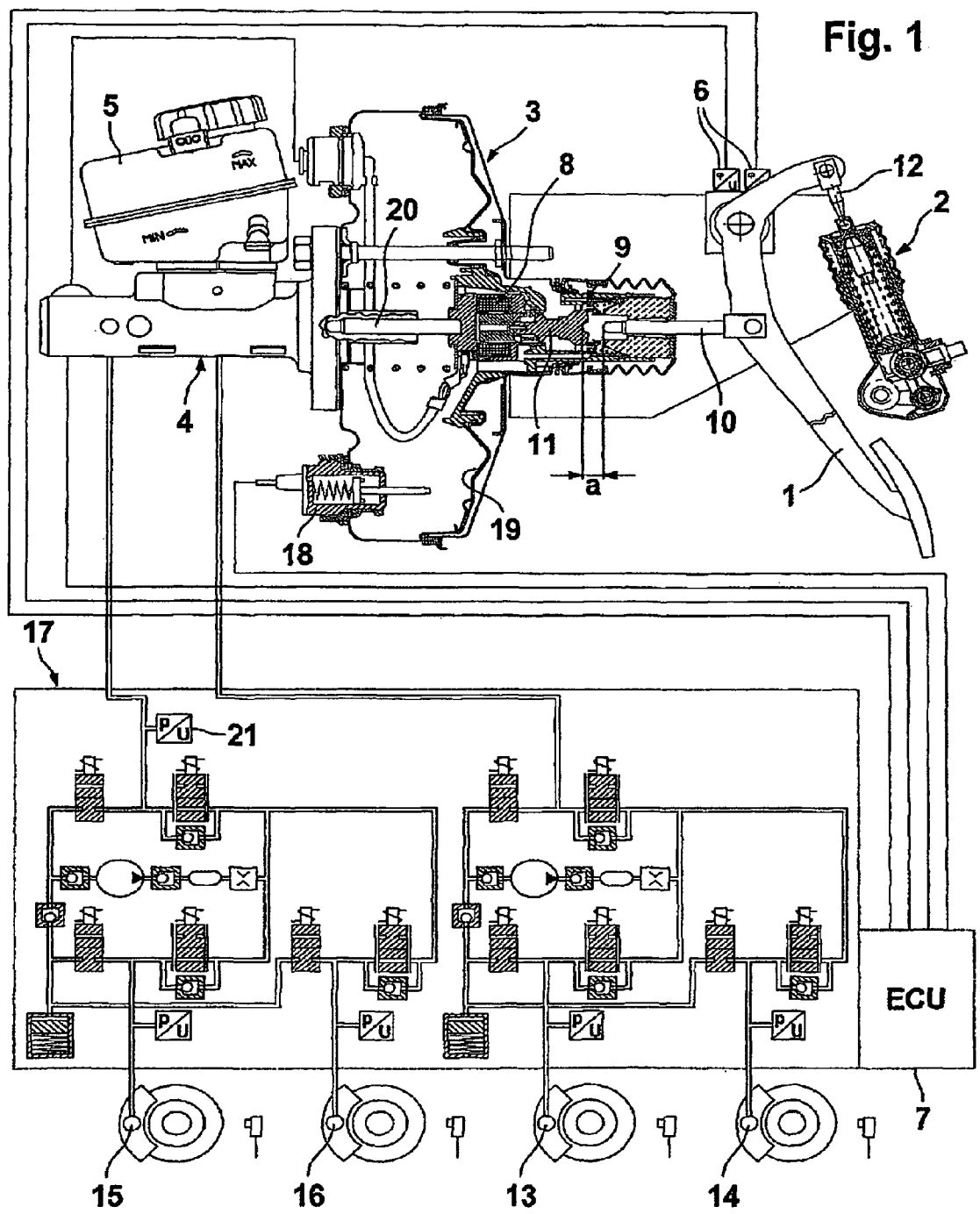
FIG. 1 is a schematic view of the brake system of the invention.

The brake system shown in a schematic view in FIG. 1 and intended for the actuation of a motor vehicle brake system of the 'brake-by-wire' type essentially comprises a brake booster, preferably a vacuum brake booster 3, a master brake cylinder connected downstream of the brake booster 3, preferably a tandem master cylinder 4, to the pressure chambers (not shown) of which wheel brakes 13, 14, 15, 16 of a motor vehicle are connected by the intermediary of a hydraulic control unit 17, a pressure fluid tank 5 associated with the master brake cylinder 4, a brake pedal 1 for actuation of the brake booster 3 by the driver, a pedal travel simulator 2 which cooperates with the brake pedal 1, in particular in the 'brake-by-wire' operating mode and imparts the customary brake pedal feel to the driver, at least one sensor device 6 for sensing a driver's deceleration request or the actuating travel $S_{Bp}$ of the brake pedal 1, as well as an electronic control unit 7, the output signals of which enable, among others, actuation of an electromagnet 8 that is associated with the brake booster 3 and renders it possible to actuate a pneumatic control valve 9 independently of the driver's wish, the said control valve controlling the supply of air to the brake booster 3. As will be explained in detail in the subsequent description, the electronic regulating unit 18 comprises a control circuit for controlling a characteristic quantity of the brake booster 3, preferably the travel $S_{Ds}$ covered by the output member 20 of the brake booster 3, or for controlling the mentioned quantity and the hydraulic pressure prevailing in the system.

An axial slot 'a' provided between the end of a piston rod 10 coupled to the brake pedal 1 and a control piston 11 of the above-mentioned control valve 9 ensures decoupling the force-transmitting connection between the brake pedal 1 and the brake booster 3 in the 'brake-by-wire' operating mode. A travel sensor 18 is used to sense the travel of a movable wall 19 that generates the boosting force of the brake booster 3 or, respectively, the travel ($S_{Ds}$) of an output member 20 of the brake booster 3 which transmits its output force onto a non-illustrated first piston of the master brake cylinder 4. Besides, a pressure sensor 21 is integrated into the hydraulic control unit 17 and senses the hydraulic pressure (p) prevailing in the system.

The pedal travel simulator 2 by which, as has been mentioned above, a resetting force acting on the brake pedal in the 'brake-by-wire' operating mode can be simulated irrespective of an actuation of the brake booster 3 is designed in such a fashion that it can be enabled in the 'brake-by-wire' operating mode when the force-transmitting connection between the brake pedal 1 and the brake booster 3 is decoupled, and can be disabled outside the 'brake-by-wire' operating mode. The pedal travel simulator 2 is actuated by means of an actuating member 12 articulated at the brake pedal 1.

Figure 2:
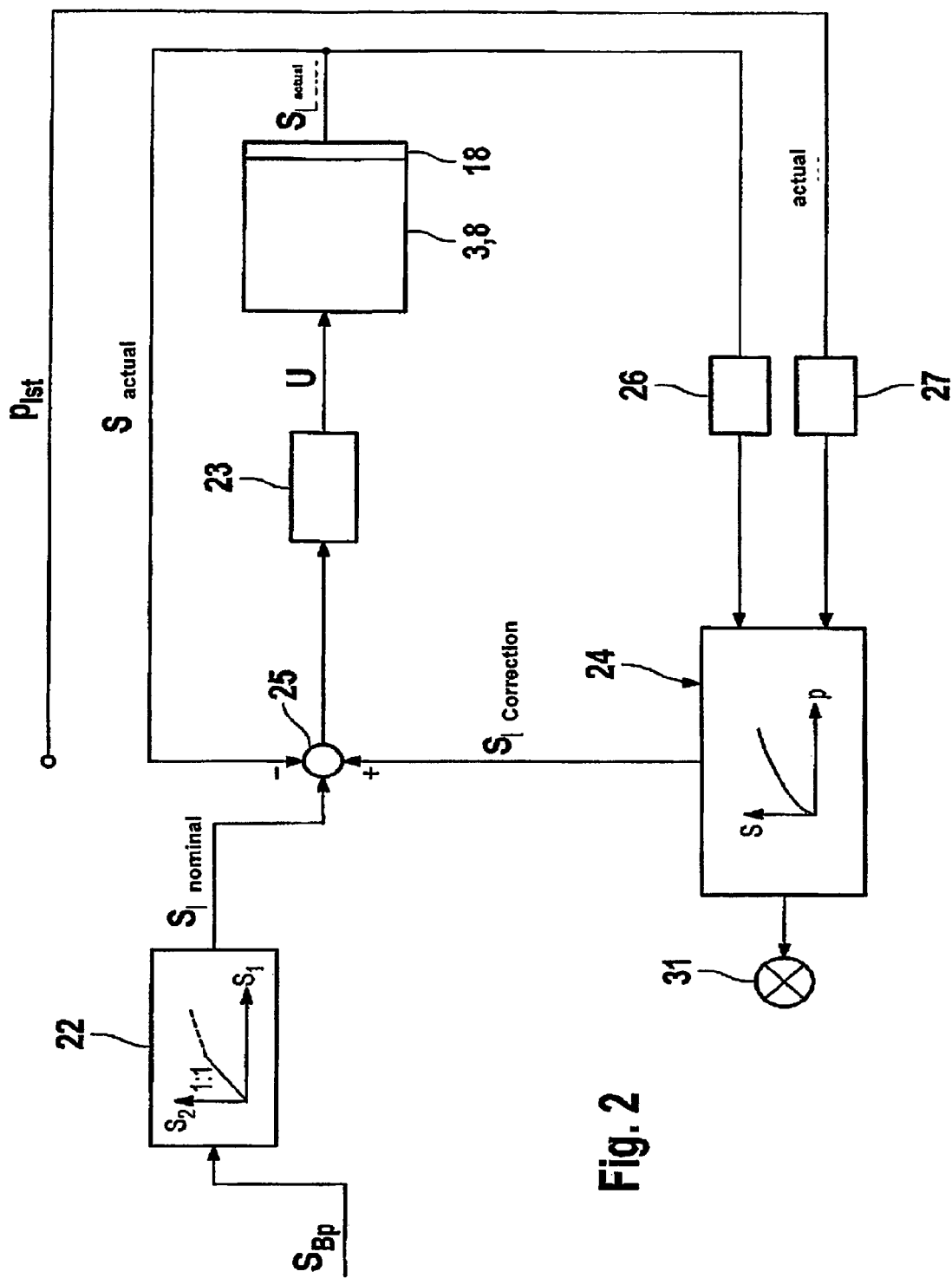
FIG. 2 shows a block diagram of a first design of a control circuit of the invention.

The first design of the above-mentioned control circuit for controlling the travel $S_{Ds}$ covered by the output member 20 of the brake booster 3 is illustrated in FIG. 2 and basically comprises a nominal-value generating module 22, a travel controller 23, and a monitoring module 24. In the nominal-value generating module 22, the nominal value $S_{Dsnominal}$ of travel $S_{Ds}$ covered by the output member 20 of the brake booster 3 is calculated from the actuating travel $S_{Bp}$ of the brake pedal 1 detected by means of the travel sensor 6. The nominal value $S_{Dsnominal}$ to which a correction value $S_{corr}$ calculated in the monitoring module 24 is added in an adder 25, is compared with the actual value $S_{Dsactual}$ of the travel covered by the output member 20 of the brake booster 3, which actual value is detected by means of the travel sensor 18, whereupon the deviation ΔS calculated this way is sent to the travel controller 23 whose output quantity, an electric voltage U, drives the electromagnet 8. The monitoring module 24, in which a pressure fluid volume/pressure characteristic curve is stored, i.e. the dependency of the pressure fluid volume absorption of the brakes 13 to 16 or of the travel $S_{Ds}$ covered by the output member (20) of the brake booster 3 and corresponding to the pressure fluid volume absorption on the hydraulic pressure (p) Q or $S_{Ds}$=f(p), is provided as input quantities with the actual values $S_{Dsactual}$, $p_{actual}$ of the travel covered by the output member 20 of the brake booster 3 and of the hydraulic pressure prevailing in the system, which preferably undergo a low-pass filtering operation in associated low-pass filters 26, 27. A travel value $S_{model}$ corresponding to a nominal value of the pressure fluid volume is calculated from the actual pressure value $p_{actual}$ in the monitoring module 24 and compared with the actual value $S_{Dsactual}$ of the travel covered by the output member 20 of the brake booster 3. When the comparison result $\Delta S_{diff}=S_{model}-S_{Dsactual}$ exceeds a threshold value $S_{threshold}$, the above-mentioned correction value $S_{corr}$ is generated which e.g. corresponds to half the value ΔS/2 of the deviation ΔS sent to the travel controller 23. An optical warning, for example, by a warning lamp 31 lighting up, can be produced simultaneously. Addition of the correction value $S_{corr}$ achieves a partial compensation of the extension of the travel $S_{Dsactual}$ covered by the output member 20 of the brake booster 3, which extension is e.g. caused by gas inclusions in the system or a brake circuit failure.

Figure 3:
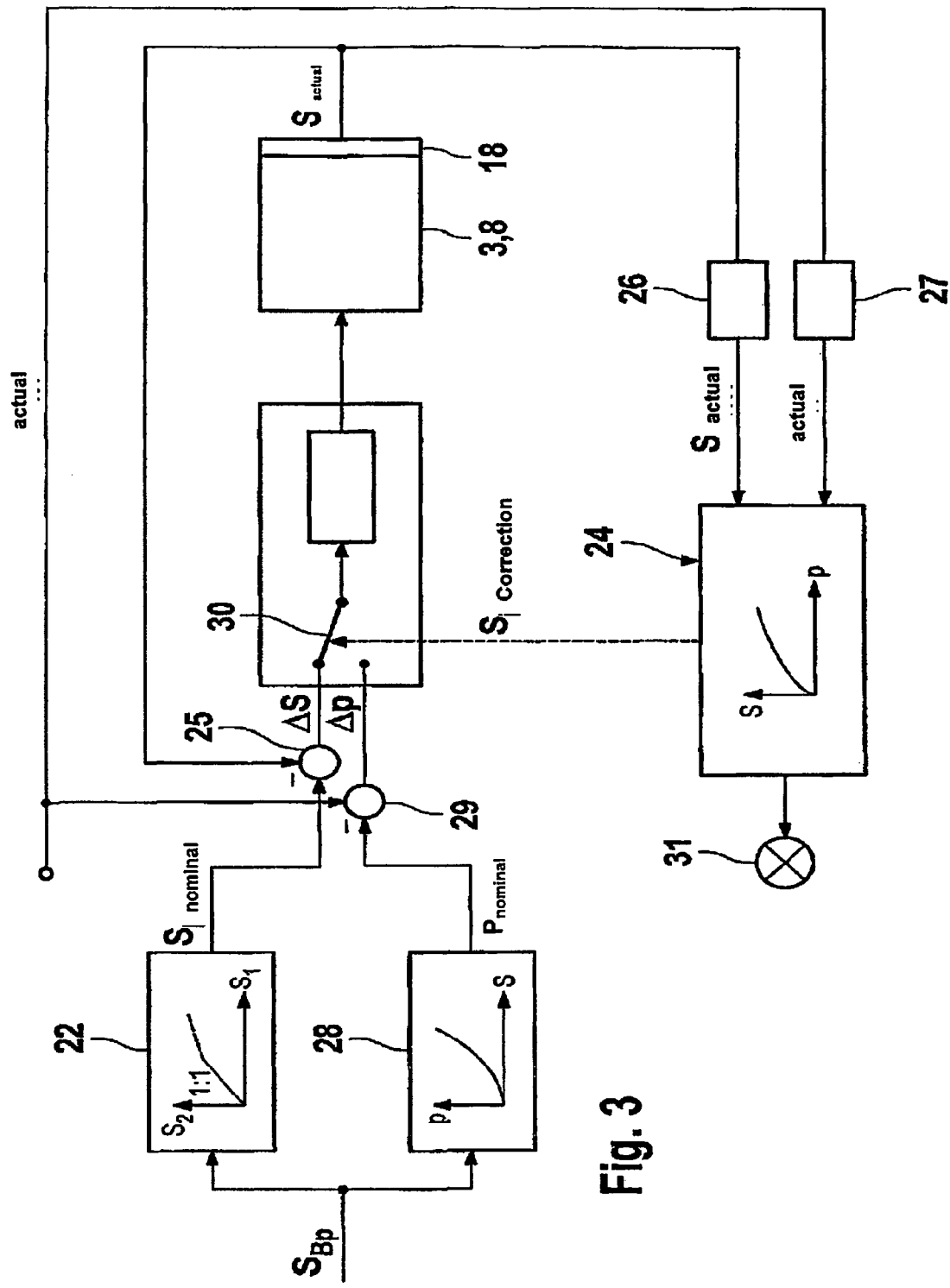
FIG. 3 shows a block diagram of a second design of a control circuit of the invention.

In the second design of the control circuit illustrated in FIG. 3, a nominal-pressure-value generating module 28 is provided in addition to the nominal-travel-value generating module 22 mentioned with respect to FIG. 2, in which the nominal value $p_{nominal}$ of the hydraulic pressure prevailing in the system is calculated from the actuating travel $S_{Bp}$ of the brake pedal 1 that is detected by means of the travel sensor 6. While the nominal travel value $S_{Dsnominal}$, like in the first design, is compared with the actual travel value $S_{Dsactual}$ in order to produce the deviation ΔS, a second deviation Δp is produced in a second adder 29 from the nominal pressure value $p_{nominal}$ and the actual pressure value $p_{actual}$. The two deviations ΔS, ΔP are sent to a switch-over device 30 which, in response to the signal $S_{corr}>0$ (switch-over condition), switches over from the travel control mode as a standard mode of operation to a pressure control mode. As this occurs, the controller 23 arranges for different parameters for the travel control and the pressure control.

Figure 4:
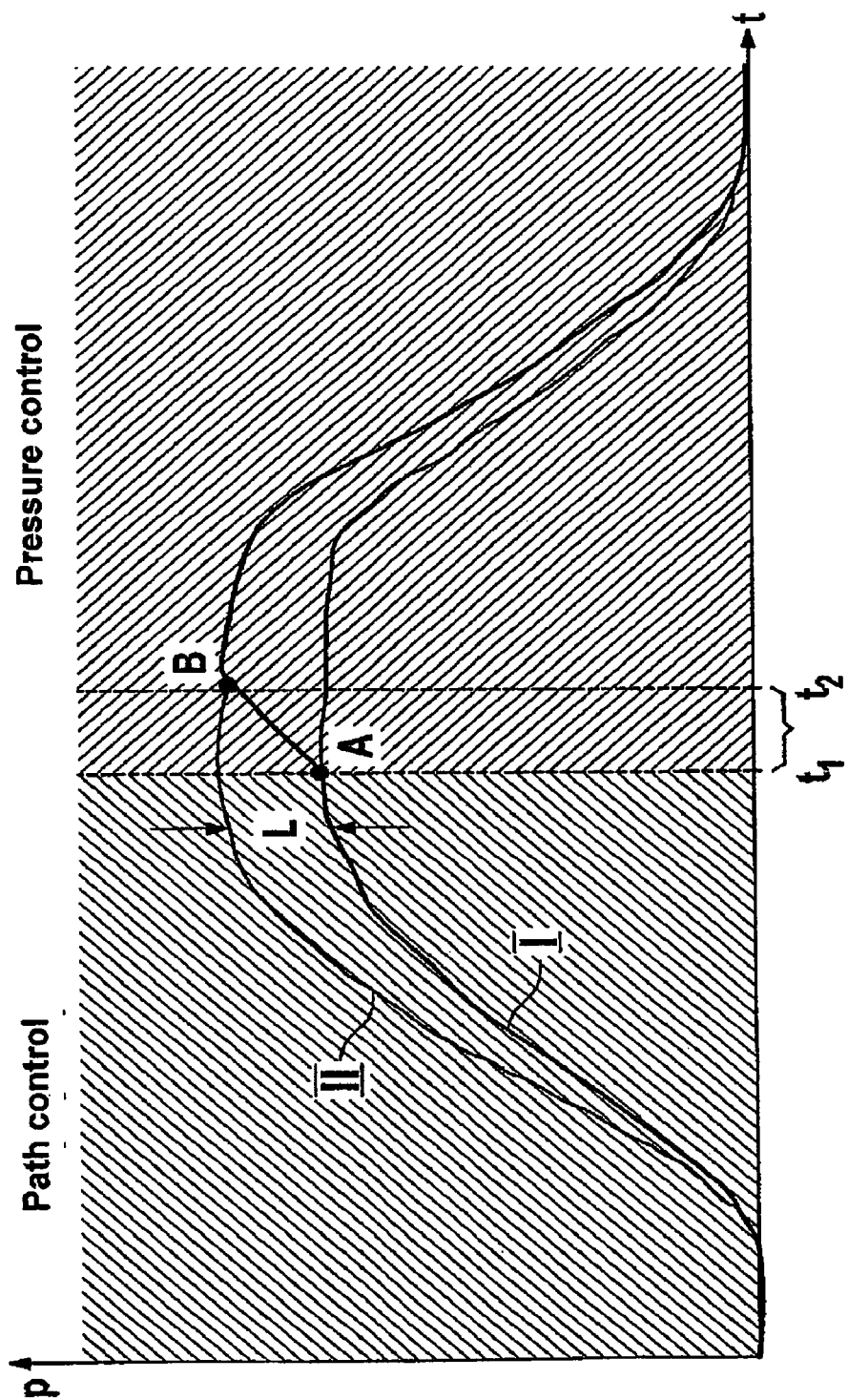
FIG. 4 shows a diagram view of the mode of operation of the second design of the control circuit shown in FIG. 3.

In order to prevent an abrupt change of the controlled variable in the second design of the control circuit, a transition function, e.g. low-pass filtering or a ramp function, is activated at the time $t_1$ (point A of the characteristic curve–end of the travel control) of the switch-over operation. This procedure is illustrated in FIG. 4, and the characteristic curve p=f(t) characterized by I corresponds to the travel control mode, while the characteristic curve designated by II corresponds to the pressure control mode, and portion A-B corresponds to the transition function. It becomes apparent from the illustration that starting with the time $t_2$ (point B of the characteristic curve) the control follows the pressure control characteristic curve. The vertical shift L between the two characteristic curves I and II is caused by gas inclusions or leakages, for example.

The invention claimed is:
1. A brake system of the 'brake-by-wire' type for actuating a motor vehicle brake system comprising:
   a brake booster operable in response to an input of a driver by a brake pedal and by an electronic regulating and control unit;
   a device provided to decouple a force-transmitting connection between the brake pedal and the brake booster in a 'brake-by-wire' operating mode;

a master brake cylinder connected downstream of the brake booster in terms of effect, to one or more pressure chambers of which wheel brakes of the motor vehicle are connected;

a pedal travel simulator which interacts with the brake pedal in order for a resetting force acting on the brake pedal can be simulated in the 'brake-by-wire' operating mode independently of an actuation of the brake booster, and which can be enabled in the 'brake-by-wire' operating mode when the force-transmitting connection between the brake pedal and the brake booster is decoupled and can be disabled outside the 'brake-by-wire' operating mode;

a first sensor (6) sensing a brake pedal actuating travel ($S_{Bp}$);

a second sensor (18) for sensing a travel ($S_{Ds}$) of an output member (20) of the brake booster;

a third sensor for sensing a brake pressure prevailing in the system, wherein output signals of the sensors are sent to the electronic regulating and control unit (7);

a control circuit for controlling the travel ($S_{Ds}$) covered by the output member (20) of the brake booster (3), a nominal value ($S_{Dsnominal}$) of the travel ($S_{Ds}$) covered by the output member (20) of the brake booster (3) being calculated corresponding to the actuating travel ($S_{Bp}$) of the brake pedal (1);

a monitoring module (24) which, in the case of a fault such as inclusion of air or brake circuit failure, performs a partial compensation of the extension of the travel ($S_{Ds}$) covered by the output member (20) of the brake booster (3), which extension is caused by the fault; and wherein a pressure fluid volume/pressure characteristic curve is stored in the monitoring module (24), so that the dependency of the pressure fluid volume absorption (Q) of the brakes or of the travel ($S_{Ds}$) covered by the output member (20) of the brake booster (3) and corresponding to the pressure fluid volume absorption (Q) on the hydraulic pressure (p) Q or $S_{Ds}=f(p)$, and in that the monitoring module (24) is furnished with the actual values ($S_{Dsactual}, p_{actual}$) of the travel ($S_{Ds}$) covered by the output member 20 of the brake booster (3) and of the hydraulic pressure (p) prevailing in the system, and a travel value ($S_{model}$) corresponding to the nominal value ($Q_{nominal}$) of the pressure fluid volume is calculated from the actual pressure value ($p_{actual}$) and compared with the actual value ($S_{Dsactual}$) of the travel ($S_{Ds}$) covered by the output member 20 of the brake booster (3), and a correction value ($S_{corr}$) is produced in the monitoring module (24) from which a fault in the system is inferred, when the comparison result ($\Delta S_{diff}=S_{model}-S_{Dsactual}$) exceeds a threshold value ($S_{threshold}$).

2. A brake system according to claim 1, wherein the partial compensation of the extension of the travel ($S_{Ds}$) covered by the output member (20) of the brake booster (3), which extension is caused by the fault, is performed by adding a correction value ($S_{corr}$) to the nominal value ($S_{Dsnominal}$).

3. A brake system according to claim 2, wherein the correction value ($S_{corr}$) corresponds to half of a difference between the nominal value ($S_{Dsnominal}$) and the actual value ($S_{Dsactual}$) of the travel ($S_{Ds}$) covered by the output member (20) of the brake booster (3).

4. A brake system according to claim 1, wherein the actual values ($S_{Dsactual}, p_{actual}$) undergo a low-pass filtering operation.

5. A brake system according to claim 1, wherein a transition function is activated when a case of fault is detected.

6. A brake system according to claim 1, wherein a warning lamp (31) is activated when a case of fault is detected in the system.

7. A brake system according to claim 5, wherein the transition function is one of a low-pass filter and a ramp function.

8. A brake system of the 'brake-by-wire' type for actuating a motor vehicle brake system comprising:

a brake booster operable in response to an input of a driver by a brake pedal and by an electronic regulating and control unit;

a device provided to decouple a force-transmitting connection between the brake pedal and the brake booster in a 'brake-by-wire' operating mode;

a master brake cylinder connected downstream of the brake booster in terms of effect, to one or more pressure chambers that wheel brakes of the motor vehicle are connected;

a pedal travel simulator which interacts with the brake pedal and due to which a resetting force acting on the brake pedal can be simulated in the 'brake-by-wire' operating mode independently of an actuation of the brake booster, and which can be enabled in the 'brake-by-wire' operating mode when the force-transmitting connection between the brake pedal and the brake booster is decoupled and can be disabled outside the 'brake-by-wire' operating mode;

a first sensor sensing a brake pedal actuating travel ($S_{Bp}$);

a second sensor (18) for sensing a travel ($S_{Ds}$) of an output member of the brake booster;

third sensor for sensing the brake pressure prevailing in the system, wherein output signals of the sensors are sent to the electronic regulating and control unit (7); and a control circuit for controlling the travel ($S_{Ds}$) covered by the output member (20) of the brake booster (3) and the hydraulic pressure (p) prevailing in the system, nominal values ($S_{Dsnominal}, p_{nominal}$) thereof being calculated corresponding to the actuating travel ($S_{Bp}$) of the brake pedal (1), and a monitoring module (24) being provided which, in the case of a fault such as the inclusion of air or brake circuit failure, switches the control circuit from the travel control mode to the pressure control mode in order to perform a compensation of the extension of the travel ($S_{Ds}$) covered by the output member (20) of the brake booster (3), which extension is caused by the fault; and wherein a transition function is activated when a case of fault is detected.

9. A brake system according to claim 8, wherein a pressure fluid volume/pressure characteristic curve is stored in the monitoring module (24), so that the dependency of the pressure fluid volume absorption (Q) of the brakes or of the travel ($S_{Ds}$) covered by the output member (20) of the brake booster (3) and corresponding to the pressure fluid volume absorption (Q) on the hydraulic pressure (p) Q or $S_{Ds}=f(p)$, and in that the monitoring module (24) is furnished with the actual values ($S_{Dsactual}, p_{actual}$) of the travel ($S_{Ds}$) covered by the output member (20) of the brake booster (3) and of the hydraulic pressure (p) prevailing in the system, and a travel value ($S_{model}$) corresponding to the nominal value ($Q_{nominal}$) of the pressure fluid volume is calculated from the actual pressure value ($p_{actual}$) and compared with the actual value ($S_{Dsactual}$) of the travel ($S_{Ds}$) covered by the output member (20) of the brake booster (3), and a correction value ($S_{corr}$) is produced in the monitoring module (24) from which a fault in the system is inferred, when the comparison result ($\Delta S_{diff}=S_{model}-S_{Dsactual}$) exceeds a threshold value ($S_{threshold}$).

10. A brake system according to claim 9, wherein the partial compensation of the extension of the travel ($S_{Ds}$) covered by the output member (20) of the brake booster (3), which extension is caused by the fault, is performed by adding a correction value ($S_{corr}$) to the nominal value ($S_{Dsnominal}$).

11. A brake system according to claim 10, wherein the correction value ($S_{corr}$) corresponds to half the result of the comparison ($\Delta S/2$).

12. A brake system according to claim 8, wherein the switch-over of the control circuit from the travel control mode to the pressure control mode is performed by the correction value ($S_{corr}$).

13. A brake system according to claim 8, wherein the actual values ($S_{Dsactual}$, $p_{actual}$) undergo a low-pass filtering operation.

14. A brake system according to claim 8, wherein a warning lamp (31) is activated when a case of fault is detected in the system.

15. A brake system according to claim 8, wherein the transition function is one of am low-pass filter and a ramp function.

* * * * *